United States Patent [19]

Aluotto et al.

[11] Patent Number: 4,477,609

[45] Date of Patent: Oct. 16, 1984

[54] HYDROSOL COATING COMPOSITIONS HAVING IMPROVED STABILITY

[75] Inventors: Patrick F. Aluotto; Paul A. Drees; Charles A. Soucek, all of Cincinnati, Ohio

[73] Assignee: Inmont Corporation, Clifton, N.J.

[21] Appl. No.: 518,788

[22] Filed: Jul. 20, 1983

Related U.S. Application Data

[63] Continuation-in-part of Ser. No. 398,733, Jul. 15, 1982, abandoned, which is a continuation-in-part of Ser. No. 254,559, Apr. 15, 1981, abandoned, which is a continuation of Ser. No. 116,179, Jan. 28, 1980, abandoned.

[51] Int. Cl.³ .............................................. C08L 63/10
[52] U.S. Cl. ................................... 523/407; 523/408; 523/409; 523/410; 523/411; 523/412
[58] Field of Search ............... 523/409, 410, 411, 412, 523/407, 408

[56] References Cited

U.S. PATENT DOCUMENTS 4,021,396 5/1977 Wu ...................................... 523/412
4,377,433 3/1983 Merz et al. ...................... 523/412 X

*Primary Examiner*—Joseph L. Schofer
*Assistant Examiner*—S. Babajko
*Attorney, Agent, or Firm*—Michael R. Chipaloski

[57] ABSTRACT

An improved, stabilized container coating composition of an amine solubilized hydrosol resin solution of:

(a) an acrylic-poly(vinyl acetal) co-resin having a number average molecular weight above 10,000 and a glass transition temperature of $-20°$ C. to $+60°$ C.;

(b) an epoxy resin having a molecular weight of 300 to 8,000; and on the average 2 or less than 2 epoxy groups per molecule; and (c) an aminoplast, a phenolplast resin, or combination thereof.

8 Claims, No Drawings

4,477,609

HYDROSOL COATING COMPOSITIONS HAVING IMPROVED STABILITY

CROSS REFERENCE TO RELATED APPLICATIONS

This application is a continuation-in-part of application Ser. No. 398,733, filed July 15, 1982; which in turn is a continuation-in-part of Ser. No. 254,559, filed Apr. 15, 1981; which in turn is a continuation of Ser. No. 116,179, filed Jan. 28, 1980 all are now abandoned.

BACKGROUND OF THE INVENTION

This invention is directed to an improved container coating composition and in particular to an improved, stable, hydrosol coating composition which forms flexible and ductile finishes on metal.

U.S. Pat. Nos. 3,997,694 and 4,021,396 describe coating compositions which are reported to exhibit properties desirable in metal can manufacturing operations requiring flexibility and adhesion. Attempts to use these coatings in end enamel applications, however, produce coatings which are either too soft or too brittle for the severe forming at the double seam which attaches the end to the can side walls.

End enamels may be classified into two categories: interior and exterior.

Interior enamels are those which provide a barrier to either protect the product being packed from the metal, e.g. beer or delicate fruits, e.g. peaches, or to prevent corrosion of the metal by the product, e.g. corn or tomatoes.

Exterior enamels have three main uses: (1) to provide a slippery surface for high speed filling operations such as those used in the beer industry, (2) to protect inks used for advertising, decoration or instruction, (3) to prevent water spotting of the metal after steam processing or pasteurization.

The coatings are applied to the metal substrate, aluminum, tinplate or tin free steel by direct rollercoating of sheets or coil stock. Generally the film weight will be between 2 and 5 milligrams of dry film per square inch of metal surface. The bake temperature, and time subjected to this temperature will be sufficient to cure the coating.

The metal end is stamped from the sheet or coil and then subjected to various forming operations. The can end may be stamped with stiffening profile rings of various design so that the lightest metals can be used. The can ends are secured to the can walls by a single or double seaming operation. The seaming operation requires excellent flexibility requires excellent flexibility and toughness from the coating so that it will not chip, fracture or peel.

The acrylic/epoxy hydrosol coatings produced in the above-mentioned patents exhibit adequate package stability, but are not useful as end-enamel coatings. Package stability, or shelf-life, is defined as the ability of a coating formulation to maintain relatively constant physical specifications and performance characteristics from the time of initial manufacture to application on a metal substrate. We have now found that a stable composition, suitable for commercial application, can be obtained through the stabilizing effect of a poly (vinyl acetal) resin on an acrylic, epoxy and aminoplast hydrosol. The poly(vinyl acetal) resin is incorporated into the composition during the formation of the acrylic polymers which are similar in composition to those described in the above-mentioned patents.

The improved compositions of this invention utilize a blend of an aminoplast resin in combination with a poly (vinyl acetal)-acrylic co-resin/epoxy hydrosol. The poly (vinyl acetal) resin is present during the formation of the acrylic resin. The nature of its state of combination with the acrylic polymer has not been determined. The improved compositions are package stable and exhibit excellent clarity, hardness, flexibility and adhesion to the metal substrates during the forming operation. It must be emphasized that the poly (vinyl acetal) resin must be present during the formation of the acrylic polymer. Solutioning the vinyl resin after the acrylic resin is prepared produces a co-resin solution which forms an unstable composition when blended with an epoxy and an aminoplast resin.

SUMMARY OF THE INVENTION

The liquid coating compositions contain as the film forming constituents a compatible hydrosol mixture that comprises:

(a) an acrylic-poly (vinyl acetal) co-resin system, the acrylic polymer having at least two or more reactive sites per polymer chain, the poly (vinyl acetal being present during the formation of the acrylic polymer.

(b) an epoxy resin having on the average two or less than two oxirane groups per molecule and at least one hydroxyl group per molecule, and having an average molecular weight of 300 to 8,000;

(c) an aminoplast or phenolplast resin or combination thereof as a curing agent.

The improved composition of this invention is stable upon storage, and when coated is ductile, has good adhesion to metal substrates, and is resistant to food staining.

DETAILED DESCRIPTION OF THE INVENTION

The liquid coating compositions contain as the film forming constituents a compatible hydrosol mixture that comprises:

(a) an acrylic-poly(vinyl acetal) co-resin system, the acrylic polymer having at least two or more reactive sites per polymer chain; the poly(vinyl acetal) resin being present during the formation of the acrylic polymer.

(b) an epoxy resin having on the average two or less than two oxirane groups per molecule and at least one hydroxyl group per molecule; and having an average molecular weight of 300 to 8,000; an aminoplast, or phenolplast resin or combination thereof as a curing agent.

The film-forming constituents of the composition are as follows: 50-90% of an acrylic polymer prepared in the presence of 2-10% of a poly(vinyl acetal) resin, 10-50% of an epoxy resin, and 3-40% of an aminoplast or phenolplast resin. Preferably, 60-80% by weight of the acrylic-poly(vinyl acetal) co-resin is used with 10-25% of the epoxy resin, and 3-10% of an aminoplast resin, or 3-30% of a phenolplast resin, as the film-forming constitutents of the improved composition. The weight percent limits of 2-10% by weight of a poly(vinyl acetal) are referred to herein as a stabilizing amount.

The acrylic polymer has at least two or more reactive sites per polymer chain which can be either a carboxyl group; a hydroxyl group, an epoxide group, a methylol group, an amine group, an amide group, or a mixture of two or more of these groups. The polymer has a number average molecular weight above 10,000 and preferably a number average molecular weight of 25,000 to 70,000 and a glass transition temperature of −20° C. to +60° C., preferably 20° C. to 35° C. The higher glass transi- The epoxy resin utilized in the novel coating composition of this invention has on the average two or less than two oxirane groups per molecule, and at least one hydroxyl group per molecule, and a number average molecular weight of 300 to 8,000. Preferably, the epoxy resin has a structure

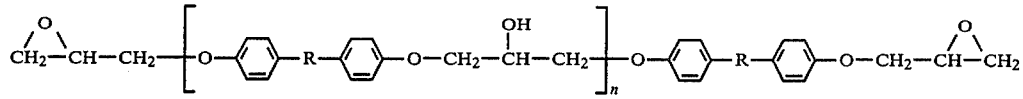

tion temperatures are preferred so that the cured film will remain tack free during storage. Coated sheets are stored one on top another in large stacks. If the coating is too low in Tg, the sheets will stick, or block and not be easily separated. This blocking severely impairs the can manufacturing process.

The acrylic polymers used in this improved invention are prepared by conventional solution polymerization techniques in the presence of a poly(vinyl acetal) resin. In a conventional solution polymerization process for preparing the acrylic polymer, the monomers, solvents and polymerization catalysts are charged into a conventional reaction vessel and heated to about 75° to 150° C. for about 2 to 6 hours to form a polymer that has the aforementioned molecular weight. The presence of a poly(vinyl acetal) resin in the polymerization media for the acrylic does not appear to adversely affect molecular weight. The formation of a graft or partial graft of the acrylic on the vinyl resin has not been established.

Typical polymerization catalysts that are used are ditertiary butyl peroxide, tertiary butyl perbenzoate, tertiary butyl peroxyacetate, benzoyl peroxide, azobisisobutyronitrile, and the like.

The constitutents of the acrylic polymer are chosen so that the polymer has a glass transition temperature of −20° C. to +60° C., and with sufficient functionality to react with the epoxy resin and to be rendered water dispersible when treated with an amine or other basic compound.

The improved coating composition in its fully cured state must be sufficiently formable so that the coating demonstrates film characteristics which allow it to withstand the rigors of fabrication without cracking, peeling, chipping, or in any way exposing the coated metal surface to the surrounding media.

The acrylic polymer component of the co-resin is, as with most conventional acrylic resins, comprised of hard segments, soft segments, and reactive constitutents which will provide the aforementioned reactive sites to the polymer chain.

Typical acrylic polymers might contain 5-50% by weight of one or more of the following monomers to provide hardness: styrene, methyl styrene, or methyl methacrylate; 40-80% by weight of an alkyl acrylate or methacrylate having 1-18 carbons in the alkyl group may be used to provide soft segments; for reactive sites, 0.5 to 10% by weight of an unsaturated functional monomer such as hydroxyethyl acrylate, methylol acrylamide; and for reactivity as well as water dispersibility an unsaturated carboxylic acid such as acrylic or methacrylic acid.

Typical alkyl acrylates and methacrylates as well as other resultant useful acrylic polymers are described in great detail in the aforementioned U.S. Pat. Nos. 3,943,187 and 4,021,396.

wherein n is an integer sufficiently large to provide a polymer having the above molecular weight.

The epoxy resins are preferably prepared by reacting epichlorohydrin and a bisphenol such as bisphenol A or bisphenol F to form an epoxy resin with the desired molecular weight. Preferably, an epoxy is utilized in which R is a methylene group or an isopropylidene group. Preferred epoxy resins of this type have an epoxide equivalent of 185 to 4,000. The epoxide equivalent is the grams of resin containing 1 gram equivalent of epoxide. Preferred resins are those commercially available from Shell, Ciba Geigy and Dow and described by the Shell trade names of Epon 828, 1001, 1002, 1004, 1007, and 1009. Epoxy blends are also preferred according to this invention.

An important criteria for end enamel acceptability is a clear film. Polymer-polymer incompatibility, as indicated by a milky or hazy appearance in the cured film, cannot be tolerated. The theory of polymer-polymer compatibility is not totally understood. From experience we know that polymer-polymer compatibility can be achieved or improved by coreacting the components, mixing low molecular weight polymers, or selecting polymers of similar optical properties so that, although compatibility is not achieved chemically or physically, the film gives a clear appearance.

In this invention, optimum compatibilization is achieved by coreacting the acrylic/vinyl coresin with an epoxy resin in the presence of a catalyst such as triphenyl phosphine, dimethylaminoethanol, or AMC-2 from Cardova Chemical Co. The carboxyl groups on the acrylic resin are then partially neutralized and water added to convert the system to a hydrosol. This procedure is preferred when preparing hydrosols from high molecular weight epoxy resin, i.e. Epon 1007 and Epon 1009. Sufficient oxirane functionality is present to allow for compatibilization, but not enough is present to cause gellation.

In some instances, when low moleclar weight epoxy resins are used, a second procedure may be employed to prevent gellation of the epoxy/co-resin system. The neutralizing amine and water are added to the reducing tank, and the reactor contents are slowly added to it under agitation. Although this procedure allowed the use of more reactive epoxy resins without the threat of gellation, and without altering the solution characteristics of the hydrosol, compatibility of the co-resins with Epon 1004 was marginal. To overcome this problem, epoxy resin blends were substituted for Epon 1004. Epon 1001-Epon 1004 and Epon 1002-Epon 1004 were preferred. The ratio of low molecular weight epoxy resin to high molecular weight epoxy resin ranged from 1:1 to 1:3. This procedure provides high quality, clear films. However, free oxirane functionality is present in the coating formulation and this product may be unstable if not formulated correctly.

Epoxy-aminoplast resin, solvent based systems have had wide range usage in end enamel applications. The excellent properties attributed to the epoxy resin significantly improve those of the acrylic resin in the hydrosol based formulation. It would be advantageous to formulate a system with optimum/maximum epoxy levels. However, although it is feasible to formulate hydrosols having a weight ratio of acrylic/epoxy of as much as 1:5, package stability was found to deteriorate with decreasing ratios of carboyxl/oxirane equivalents. This is especially true when attempting to get high levels of low molecular weight epoxy resins (Epon 1004 and below) in the hydrosol.

When using the second procedure described above, the preferred, method to compatibilize low molecular weight epoxy resins without gellation, little or no reaction occurs when casting the acrylic/vinyl/epoxy mass into water and amine. Compatibilization occurs when the hydrosol is baked at elevated temperatures. The shelf life of this type formulation is very popor if the carboxyl/oxirane ratio is too low, that is, the hydrosol consists of salted carboxyl groups and unreacted oxirane groups. During storage, the hydrosol gels.

To overcome the inherent instability caused by having a carboxyl containing acrylic resin in the presence of an epoxy resin and amine it was necessary to select the optimum ratio of carboxyl/oxirane functionality. The examples in The Table illustrate the effect of carboxyl/oxirane ratio on package stability.

The acrylic/vinyl co-resin solution was prepared as in the examples which follow. To this solution was added, for example, Epon 1002 and Epon 1004. The ratio of carboxyl to oxirane equivalents ranged from 0.40 to 1.2. The solution was poured into amine and water and coverted to a hydrosol. After several days the aqueous composition gelled.

The above examples were repeated. The ratios of carboxyl to oxirane equivalents ranged from 1.5–7.1. In this range of compositions, the hydrosol solutions were stable.

The poly(vinyl acetal) resins utilized in the invention are solution types, i.e., those which can be dissolved in a suitable solvent without adversely affecting the solids/viscosity ratio of the formulation. There are a number of different processes practiced commercially for the manufacture of poly(vinyl acetals). The specific process depends on the particular acetal being formed. There are two processes being used in the U.S. One employs an aqueous solution of a poly(vinyl alcohol) and the other starts with poly(vinyl acetate) which is acid hydrolyzed and subsequently acetalized. The manufacture of these resins is well known in the art and forms no part of the present invention.

Suitable crosslinking or curing agents are the amino or aminoplast resins which include those products derived from urea, benzoguanamine and melamine. The manufacture of the commercially available benzoguanamine formaldehyde, urea-formaldehyde and melamine-formaldehyde resins used in the invention is well known in the art and forms no part of the present invention. Preferred crosslinking agents include the water soluble hexamethoxy methyl-melamines marketed under the trade designation Resimene ® or Cymel ®.

Also suitable for curing agents are the phenolformaldehyde or phenolplast resins. These resins may be dissolved in the organic solution after the polymerization of the acrylic and solutioning of the epoxy resin, and prior to the addition of water. The phenolplast need not be water soluble.

Lubricants are added to the end enamel formulations to improve "slip" (reduce friction) as the can passes through the high speed filling lines, and to prevent damage to the coating during fabrication. Lubricants may be derived from natural or synthetic waxes or from other compounds which contribute lubricity to the coating surface (silicone additives, polyethylenes, polyhalogenated ethylenes). The lubricant may be added to the formulation in a solvent, aqueous or emulsion suspension, solvent suspension or as a liquid or solid. The preferred lubricants are those easily dispersed in the aqueous system, i.e., Hodag or Michem emulsions. Some sources of these products are Hodag, Petrolite Corporation-Bareco Division, Nopco Chemical, Michleman Chemical.

In the hydrosol formulations of the present invention the acrylic polymer is neutralized with a basic compound to render the polymer water dispersible. Typical basic compounds are ammonia, primary amines, secondary amines, tertiary amines, hydroxyl amines, alkanolamines and the like. Typical compounds are monoethanolamine, methylethanolamine, methyldiethanolamine, diisopropanolamine, butanolamine, diethylaminoethanol, dimethylethanolamine, triethylamine, triisopropanolamine, hexanolamine, octylamine, ethylenediamine, diethylenetriamine, triethylenetetramine, hexamethylenetetraamine, tetraethylenediamine and the like. Preferred are diethylaminoethanol, dimethylethanolamine, triethylamine, and 2-dimethylamino-2-methyl-1-propanol (DMAMP).

DESCRIPTION OF THE PREFERRED EMBODIMENTS

The following examples illustrate the invention. The parts and percentages are by weight unless otherwise specified.

EXAMPLE 1

To a reactor was charged ¼ of the mixture of

| | |
|---|---|
| Propanol | 77.0 g. |
| Ethylene glycol monoethyl ether | 180.0 g. |
| Methyl methacrylate | 228.0 g. |
| Ethyl acrylate | 336.0 g. |
| Acrylic acid | 36.0 g. |
| Benzoyl peroxide | 1.8 g. |

The flask was sparged with inert gas and slowly heated to reflux at approximately 102°–105° C. At reflux, the remaining monomer/catalyst mix was added over two hours. After a one hour hold at reflux temperature

| | |
|---|---|
| Dimethylamino ethanol | 35.5 g. | was added under agitation. The epoxy resin

| | |
|---|---|
| Epon 1004 | 78.7 g. | was then slowly added to the mixture and held for approximately fifteen minutes. Heat was removed from the reactor and

| Water | 1313.7 g. | was added to convert the organic composition to a hydrosol. The resulting aqueous composition had the following properties.

| Viscosity | 180 sec. Ford #4 at 77° F. |
| pH | 8.0 |
| TNV | 29.5% |

The above aqueous composition was applied, by roller coater, to tinplate substrate at end enamel film weights (2–5 mg/in$^2$). The plate was baked at 360° F. for 12 minutes, then at 400° F. for 10 minutes. A can end was fabricated and tested for adhesion loss after steam processing. Testing indicated a soft film which demonstrated poor impact resistance.

The above procedure was repeated, but a melamine-formaldehyde resin was added to improve surface hardness and impact resistance. Levels of aminoplast ranging from 3–15% on solid acrylic/epoxy resin were utilized. Repeating the application and testing procedure led to an improved film for end-enamel application. Generally, less than stoichiometric amounts of hexamethoxymethyl melamine, based on the hydroxyl content of the epoxy resin, gave poor impact resistance.

Stability data, however, indicated the hydrosol composition containing melamine-formaldehyde resin would become heterogeneous after 2–4 weeks, i.e., a separation occurred which could not be redispersed into the liquid phase.

To improve the stability of the aqueous composition, Example 1 was repeated with a modification. 2.7 grams poly (vinyl butyral) per hundred parts acrylic/epoxy, was added to the initial polymerization solution. After dissolving the PVB, polymerization and conversion to the hydrosol was carried out as in the example.

An end enamel was formulated and subjected to the same application and testing procedure as above. The end enamel performed adequately. After 42 months at ambient temperatures the formulated coating composition did not drift excessively in viscosity and remained homogeneous.

A control, based on Example 1, but containing no PVB, began separating after several weeks at ambient temperature.

EXAMPLE 2

Polymer Formulation

| | Grams |
|---|---|
| 1. Propanol | 1668 |
| 2. Ethylene Glycol Ethyl Ether | 3996 |
| 3. Vinyl Resin (XYHL) (Union Carbide) | 338.5 |
| 4. Ethyl Acrylate | 7013 |
| 5. Methyl Methacrylate | 5193 |
| 6. Acrylic Acid | 779 |
| 7. Benzoyl Peroxide | 97.4 |
| 8. Epon 1004 | 725 |
| 9. Epon 1002 | 1450 |
| 10. DMAMP-80 | 958.5 |
| 11. Water | 25800 |

An electrically heated 10 gallon reactor was charged with 1 and 2. The solvents were heated to 75° C. and the vinyl resin 3 was added. After 3 was completely dissolved, the temperature was increased to 100° C. and a mixture of 4–7 was added over 2 hours. After a 1 hour hold at 100° C., 8–9 was added and the molten mass held for an additional 1 hour. The reactor contents were cast into 10 and 11 under agitation.

The resulting hydrosol had the following specifications:

| Vis. | 78 sec., Ford #4 cup at 77° F. |
| pH | 7.6 |
| Non-volatiles | 31.9% (Calc. 32.1%) 10 minutes at 400° F. |

Formulation

| Acrylic/Epoxy/Vinyl Hydrosol | 84.00 |
|---|---|
| Resimene 745 | 15.50 |
| Lubricant (Hodag 216) | 0.50 |
| | 100.00 |

An end enamel formulation was prepared from the above and applied by direct rollercoater to tinplate at 3.5 mg/sq. in. The coating was baked for 12 minutes at 350° F. and then rebaked 10 minutes at 400° F. A can end was stamped out, and then subjected to steam processing for 90 minutes at 250° F. The processed end was treated with dilute copper sulfate solution to visualize cracks and fractures in the coating surface.

The above formulation produced an acceptable coating and had excellent package stability.

EXAMPLE 3

Polymer Formulation

| | Grams |
|---|---|
| 1. Propanol | 77.0 |
| 2. Diethylene Glycol Monobutyl Ether | 180.0 |
| 3. Poly (Vinyl Butyral) [Butvar 90] (Monsanto) | 16.4 |
| 4. Acrylic Acid | 36.0 |
| 5. Ethyl Acrylate | 324.0 |
| 6. Methyl Methacrylate | 240.0 |
| 7. Benzoyl Peroxide | 4.5 |
| 8. Eponex 1510 (Shell) | 50.0 |
| 9. DMAMP 80 | 443.0 |
| 10. Water | 1200.0 |

The procedure used in Example 2 was followed to prepare a hydrosol from the above ingredients. The resulting hydrosol had the following specifications:

| Viscosity | 91 sec. Ford #4 cup at 77° F. |
| pH | 7.6 |
| Non-volatiles | 30.2 (30.7 calc) 10 min. at 375° F. |

Coating Formulation

| Acrylic-Vinyl/Epoxy Hydrosol | 83.0 |
|---|---|
| Cymel 303 | 16.5 |
| Lubricant (Michem 19325) | 0.5 |
| | 100.0 |

The coating formulation was applied to tin free steel at 3 mg/sq. inch and baked at 375° F. for 12 minutes and rebaked at 400° F. for 10 minutes. A can end was stamped out and subjected to tests for steam process resistance, adhesion and fabrication (as in Example 2). The coating's performance was judged very good in all tests. Package stability of the formulation was excellent.

EXAMPLE 4

The stability of hydrosol systems containing as the solid components the product of an acrylic resin formed in the presence of a poly(vinyl acetal) resin, an epoxy resin and an aminoplast was demonstrated in examples 1, 2 and 3. The stabilizing influence of a poly(vinyl acetal) can also be demonstrated in formulations in which a phenolplast is used as a curing agent in place of an aminoplast. The following is an example to illustrate this effect.

An acrylic resin was formed using the following procedure:

| | |
|---|---|
| Ethylene glycol monobutyl ether | 3496 |
| Isopropanol | 388 |
| Styrene | 270 |
| Ethyl Acrylate | 495 |
| Acrylic Acid | 135 |
| Benzoyl Peroxide | 13 |

The above were charged to a glass reactor equipped with a stirrer, agitator, thermometer and a reflux column. The reactor contents were heated to reflux, about 120° C., and a mixture of the following was added over 3.5 hours.

| | |
|---|---|
| Styrene | 1533 |
| Ethyl Acrylate | 2811 |
| Acrylic Acid | 766 |
| Benzoyl Peroxide | 73 |

Additional catalyst may be added after the addition of the monomer mix is completed to bring the final conversion to about 100%.

The above acrylic resin, at 60% total nonvolatiles, was incorporated into a hydrosol formulation by heating it at 65° C. with an epoxy functional resin, and then blending in a phenolplast resin at 60% TNV. After addition of an amine to partially neutralize the acrylic polymer, water was added to convert the organic solution to a hydrosol. The following composition illustrates a typical formulation.

| | |
|---|---|
| Acrylic Resin (from above) | 2542 |
| Epon 1007 | 1129 |
| Triethylamine | 168 |
| Phenolic Resin (60%) | 2461 |
| Water | 3027 |

The above formulation can be applied by roller coat. However, after 2 days at room temperature the formulation began to separate.

An acrylic was prepared following the above outlined procedure, but in this example a poly(vinyl butyral) resin was dissolved in the reaction solvent. Formation of the acrylic polymer occurred in the presence of the butyral resin.

| | |
|---|---|
| Ethylene glycol monobutyl ether | 3438 |
| Isopropanol | 382 |

-continued

| | |
|---|---|
| Butvar 90 | 161 |

The above were charged to a glass reactor equipped as above. The vinyl resin was dissolved in the solvent, and then the following monomers were added:

| | |
|---|---|
| Styrene | 266 |
| Ethyl Acrylate | 487 |
| Acrylic Acid | 133 |
| Benzoyl Peroxide | 13 |

The reactor contents were brought to reflux, and the following mixture was added over 3.5 hours:

| | |
|---|---|
| Styrene | 1508 |
| Ethyl Acrylate | 2766 |
| Acrylic Acid | 754 |
| Benzoyl Peroxide | 72 |

Additional benzoyl peroxide may be added to raise conversion to about 100%.

The above acrylic-poly(vinyl butyral) co-resin was heated at 65° C. with an epoxy resin, and then blended with a phenolplast resin. An amine was added to partially neutralize the acrylic carboxyls, and water was added to convert the system to a hydrosol.

The above system was easily applied by roller coat. It showed no signs of separating after one month at room temperature.

EXAMPLE 5

The following illustrates a formulation containing high molecular weight epoxy resin. An acrylic resin is formed using the following procedure:

| | |
|---|---|
| Ethylene glycol monobutyl ether | 7.18 |
| Butanol | 2.30 |
| Hexylene glycol | 2.03 |
| Butvar 90 | 0.71 |

The vinyl resin is completely dissolved in the solvents and then a mixture of the following monomers and catalyst is added under reflux of about 120° C.

| | |
|---|---|
| Methacrylic Acid | 2.42 |
| Ethyl Acrylate | 14.64 |
| Methyl Methacrylate | 7.18 |
| Styrene | 2.69 |
| t-Butyl peracetate | 0.20 |

The polymerization is carried out to 99% conversion and the following items are added to the hot reaction mass:

| | |
|---|---|
| Epon 1009 | 13.48 |
| Diethylene glycol monobutyl ether | 2.99 |

The epoxy resin is completely dissolved and then the following item is added:

| | |
|---|---|
| Dimethylaminoethanol | 1.20 |

The temperature is maintained at 120° C. until the mixture clears. The reaction mass is diluted with the following to convert the system

| | |
|---|---|
| Water | 43.00 | to a hydrosol. The resulting hydrosol has a total nonvolatiles of 40%, and a viscosity of 130 seconds in a Ford #4 cup at 77° F. The pH is 7.2.

Coating Formulation

| | |
|---|---|
| Hydrosol from Ex. 6 | 96.5 |
| Cymel 303 | 3.0 |
| Lubricant (Hodag 216) | 0.5 |
| | 100.0 |

The above formulation was applied to aluminum metal at 3.8 mg/sq. in. A 307 can end was stamped out and the metal end subjected to tests for steams processing, adhesion and flexibility. The product was acceptable and showed no signs of significant viscosity change after 8 weeks.

EXAMPLE 6

Using the procedure outlined in Example 2, three vinyl resins were used in three different experiments in place of Vinylite XYHL. The effect of molecular weight and source of supply of the stabilizing resin on the stability of the formulation was the objective of these experiments.

Effect of Different Vinylbutyral Resins on Stability

| Resin | Molecular Weight | Vinyl Butyral Content (min. %) |
|---|---|---|
| 1. Union Carbide's XYHL | 38,000–45,000 | 80.0 |
| 2. Union Carbide's XYSG | 100,000–150,000 | 80.0 |
| 3. Monsanto's Butvar-90 | 38,000–45,000 | 80.0 |
| 4. American Hoechst's Mowital B 20 H | 40,000–50,000 | 75.0 |

The three resins were used on a one for one replacement basis for the XYHL resin in the preparation of the acrylic polymer. As in Example 2, the epoxy resin was dissolved in the reaction mass of the acrylic-vinyl co-resin solution, neutralizing amine added, and the partially neutralized mass poured into water under vigorous agitation.

The hydrosols which resulted from the above experiments were formulated into finished formulations by the addition of a melamine-formaldehyde resin and adjusted to application viscosity. The high molecular weight of the XYSG resin had no visible effect on the viscosity of the resulting hydrosol. All formulated samples were stable after 1 month at 120° F.

Union Carbide's AYAT, a polyvinyl acetate resin, was substituted for the vinyl butyral resins to determine its influence on formulation stability. The procedure of Example 2 was repeated substituting AYAT for XYHL. The finished composition containing a melamine-formaldehyde resin and adjusted to coating viscosity exhibited the same instability as those compositions containing no stabilizing resin.

We claim:

1. A hydrosol coating composition comprising
   (a) 50–90% of an acrylic-poly(vinyl acetal) co-resin of which the acrylic moiety has two or more reactive sites per polymer chain,
   (b) 5–50% of an epoxy resin having on the average 2 or less than 2 epoxide groups per polymer chain with at least one hydroxyl group per polymer chain and having an average molecular weight of 300 to 8,000,
   (c) 3–40% of an aminoplast or phenolplast resin or combination thereof.

2. The hydrosol coating composition of claim 1 wherein the acrylic-poly(vinyl acetal) co-resin has a number average molecular weight above 10,000 and a glass transition temperature of −20° C. to +60° C.

3. The hydrosol coating composition of claim 1 wherein the acrylic polymer has at least two or more reactive sites selected from any of the group consisting of carboxyl, hydroxyl, epoxide, methylol, amide and amine.

4. The hydrosol coating composition according to claim 1 wherein the composition additionally contains a lubricant.

5. A hydrosol coating composition comprising
   (a) 50–90% of an acrylic-poly(vinyl acetal) co-resin of which the acrylic moiety has at least two or more reactive sites per polymer chain,
   (b) 5–50% of an epoxy resin having on the average 2 or less than 2 epoxide groups per polymer chain with at least one hydroxy group per polymer chain and having an average molecular weight of 300 to 8,000,
   (c) 3–40% of an aminoplast or phenolplast resin or combination thereof.

6. The hydrosol coating composition of claim 5 wherein the acrylic-poly(vinyl acetal) co-resin has a number average molecular weight above 10,000 and a glass transition temperature of −20° C. to +60° C.

7. The hydrosol coating composition of claim 5 wherein the acrylic moiety of the acrylic-poly(vinyl acetal) co-resin system has at least two or more reactive sites selected from any of the groups consisting of carboxyl, hydroxyl, epoxide, methylol, amide and amine.

8. The hydrosol coating composition according to claim 5 wherein the composition additionaly contains a lubricant.

* * * * *